United States Patent [19]

Brock

[11] 4,025,467

[45] May 24, 1977

[54] STRONG ANION EXCHANGE RESINS FREE OF ACTIVE CHLORIDE AND METHOD OF PREPARATION

[75] Inventor: Herbert B. Brock, Philadelphia, Pa.

[73] Assignee: Rohm and Haas Company, Philadelphia, Pa.

[22] Filed: June 13, 1975

[21] Appl. No.: 586,676

[52] U.S. Cl. .............................. 260/2.1 E; 526/47
[51] Int. Cl.² ........................................ C08J 5/20
[58] Field of Search ......... 260/2.1 R, 2.1 E, 2.1 C; 210/30; 526/47

[56] References Cited

UNITED STATES PATENTS

| | | | |
|---|---|---|---|
| 2,669,713 | 2/1954 | Osmun | 210/30 R |
| 2,723,245 | 11/1955 | Wheaton | 260/2.1 E |
| 2,999,821 | 9/1961 | Fisher | 210/30 R |
| 3,645,921 | 2/1972 | Salem et al. | 260/2.1 E |

*Primary Examiner*—Joseph L. Schofer
*Assistant Examiner*—Peter F. Kulkosky

[57] ABSTRACT

Process for preparing a strongly basic anion exchange resin free of chloride by a two-stage method involving converting covalent chlorine in the resins polymer network to ionic chloride by solvolytic displacement followed by conversion of the resin from the normal chloride form through an intermediate ion form to the hydroxide form, and the strongly basic chloride free anion exchange resin.

15 Claims, No Drawings

STRONG ANION EXCHANGE RESINS FREE OF ACTIVE CHLORIDE AND METHOD OF PREPARATION

This invention relates to chloride-free strongly basic anion exchange resins and their method of preparation.

Strongly basic anion exchange resins are today used in many water treatment applications to purify streams which are in contact with metals, especially ferrous metals. Unfortunately, such resins essentially always contain chloride ion which may leach into the treated fluid to cause corrosion of such metals. In advanced cases such corrosion can cause stress and subsequent rupture of the metal.

The conditions under which chloride ion may be displaced from resin include treatment of the resin with (1) solutions containing ions for which the resin has a selectivity preference approaching, equaling or exceeding chloride; (2) highly concentrated solutions containing ions for which the resin has low to high selectivity; and (3) fluids containing complexes for which the resin has high affinity. Additionally, resins with high chloride content may lose chloride to relatively pure solvents or solvent mixtures (usually polar) especially under conditions of high temperature, pressure and the like.

Recognizing the corrosion problem with $Cl^-$ containing resins, many industrial resin users have today set standards which limit the chloride content of resins they utilize in their systems. Rigid specifications have, for example, been set by fabricators of equipment used in nuclear reactor systems, where corrosion and equipment failure can result in leakage of radioactive materials. Moreover, any system which may be corroded or contaminated by chloride ion may utilize a chloride-free anion exchange resin.

Unfortunately, conversion of the normal chloride form of the strong anion exchange resin to the hydroxide form by the prior art methods has not achieved the goal of completely removing "active" chloride ions. Typically, the so-called nuclear grade (low chloride) anion exchange resins available heretofore have contained 2–10% equivalent chloride ion (based upon total exchangeable ions) and have, consequently, been limited in the amount of their functional capacity in the hydroxide form.

I have now discovered that strong anion exchange resins essentially free of active chloride and containing less than 0.5% and preferably less than 0.1% (equivalent % based on total ion capacity) of active chloride may be prepared by a novel process which comprises pretreating a formed anion exchange resin with an aqueous medium (solvolytic displacement) followed by a two-step conversion of the resin to the hydroxide form. In a preferred embodiment, the two-step conversion is accomplished by replacing chloride with ions from solutions that have been subjected to ion exchange methods to remove minute amounts of chloride.

I have further discovered that a strong anion exchange resin (in the normal chloride form) that has been treated to convert it to the hydroxide form, without other processing, will tend to show an increase in active chloride immediately after conversion and subsequently during storage. To illustrate, in about 2 hours after "complete" conversion to the hydroxide form the active chloride content of a strong anion exchange resin will typically rise 0.1–0.2% and thereafter will rise an additional 0.1 to 0.3% during the next 2 weeks to 2 months. By "active" chloride used herein it is meant that the chloride is in ionic form and therefore leachable from the resin, as distinguished from chlorine which is strongly bound and releasable usually only upon destruction of the resin.

It has been found that the source of increased active chloride is (A) unreacted chlorine sites in the polymer network resulting from incomplete functionalization of the resin or (B) chlorine introduced to the normally inert copolymer matrix which thereafter converts from covalent to ionic form upon conversion of the resin to hydroxide form. In this regard, it is further postulated that the functional group of the ion exchange resin in hydroxide form is capable of causing migration of chlorine within the molecule.

In order to eliminate subsequent increases in active chloride by the method of the invention the resin, as manufactured in the chloride form, is subjected to a "solvolytic displacement" treatment in an aqueous base or salt at a temperature above ambient, preferably above about 50° C and below about 150° C to convert all the non-ionic chloride to ionic chloride. An especially preferred temperature range is between about 60° C and 120° C. The bases and salts which may be used to convert the covalent chloride to ionic chloride include strong inorganic and organic bases such as alkali and alkaline earth metal hydroxides, alkaline salts such as alkali and alkaline earth metal phosphates, silicates and carbonates, etc. Organic bases include amines, especially quaternary amines and their salts, metal alkoxides, alkali metal hydroxides and salts of weak organic acids. Solvolytic displacement is highly dependent upon temperature and time at a given pH. For example, it will take approximately 2 hours at 95° C at a pH of 12 to effect essentially complete displacement of chloride while at 75° C and pH of 12 the displacement is incomplete after 2 hours ($Cl^-$ increases 0.2% over a period of several months). At a higher pH or temperature, concurrently shorter periods of processing are required.

Subsequent to changing covalent chlorine to chloride the resin must be converted from the chloride form to hydroxide form by means of a two-step ion exchange. Direct conversion from chloride to hydroxide is highly limited (90% complete) owing to strong preference of the quaternary ammonium functional group of the ion exchange resin for chloride over hydroxide. A compound of intermediate selectivity (such as a salt or acid) is used therefore to reduce the chloride to a level unachievable by hydroxide. Subsequently, the hydroxide will easily displace the intermediate ion.

Suitable acids and salts are those which exchange with chloride form resins, preferably those which have anions intermediate in selectivity between chloride and hydroxide. Even more preferred are sodium bicarbonate sulfuric acid, sodium carbonate, sodium nitrate and sodium sulfate. (See, e.g. U.S. Pat. No. 2,723,245.)

Suitable compounds for conversion from the intermediate ion form to the hydroxide form are well known to those skilled in this art. They include the strong inorganic and organic bases such as the alkali metal hydroxides, alkaline earth metal hydroxides, alkali metal hydrides, quaternary amines, tertiary amines, alkali metal alkoxides and the like. Of particular commercial significance are sodium and potassium hydroxide, which are accordingly preferred.

I have further found that when seeking to reduce the chloride content of a strong base resin to an almost imperceptible extent (preferably below 0.1% of ion capacity), the process of the present invention cannot be operated directly with ordinary commercial grades of strong base to produce the resin in its "pure" hydroxide form. Even the minute amounts of chloride contained in essentially "pure" grades of inorganic bases are readily adsorbed by the ion exchange resin to be treated. Nor can city water (containing minute amounts of chloride ion) normally be used as a solvent for such materials. Both the water and the base must, therefore, be subjected to pre-treatment with a "chloride trap", i.e., subjected to ion exchange treatment with a resin highly selective for chloride ion, to eliminate all traces of chloride.

Any quaternary anion exchange resin can be used as a chloride trap resin for the purpose of reducing, restricting, or eliminating ionic chloride intrusion into another resin. One well-known group of such resins may be produced from styrene and substituted styrenes containing a relatively minor proportion of a polyethylenically unsaturated crosslinking agent such as divinylbenzene, trivinylbenzene, divinyl toluene and the like, as will be explained more fully when describing suitable resins for preparation of the chloride-free resins of the invention. As a broad class of compounds, any strongly basic resin which normally has a higher affinity for ionic chloride than it has for hydroxide ion, and which can be stripped of its available chloride ion by another chemical agent to a greater degree than possible by any attempted displacement by caustic regenerated, would then be able to adsorb chloride ions from a caustic solution to a level at which the caustic displaces the chloride from the resin, thus acting as a chloride trap resin. As an example, two columns of the same resin can be connected in series and operated so that one column will contain a larger share of a chloride than will the other column. Preferably, however, the chloride trap resin should have a greater affinity for chloride ion than does the product column.

Resins of varying chloride to hydroxide selectivity numbers can be produced synthetically by subtle or gross changes in the resin composition and processing. Of particular significance to the chloride-hydroxide selectivity delta is the type and degree of crosslinking imparted to the resin and the particular amine used to make the functional group of the resin. The degree of crosslinking imparted to the resin significantly influences the selectivity values through influencing the accessibility to the exchange sites of competing ions. The basicity of the amine used to produce the functional group influences the ability of the final resin products to consume hydroxide ions from a solution of hydroxide ions. To be able to retain neutral chloride ions against a highly basic environment, the resins must function as insoluble strong bases typified by the various quaternary ammonium groups available today or by such other basic groups as the phosphonium group and the sulfonium group. The preferred resin, for the purpose of using it as a chloride trap, is synthesized to exhibit the greatest numerical difference in chloride to hydroxide selectivity, to the point of being unable to regenerate the chloride from the resin under any conditions using caustic regenerant, but allowing displacement by other chemical agents.

The anion exchange resins of the present invention which may be rendered essentially free of active chloride by solvolytic displacement, followed by a two-step conversion from the chloride form to an intermediate ion form and then the hydroxide form, are a large body of resins prepared by certain prior art techniques which inherently yield resins having covalent chlorine in the polymer network and capable of migration. A large body of resins of this class are the reaction products of a tertiary amine and an insoluble, crosslinked copolymer of an aromatic monovinyl hydrocarbon and an aromatic divinyl hydrocarbon, which copolymer contains haloalkyl groups having the formula $-C_nH_{2n}-X$ in which X is a chlorine or bromine atom and $-C_nH_{2n}$ is an alkylene group in which $n$ is an integer from 1 to 4.

The crosslinked polymers containing aromatic nuclei used for carrying out this purpose are well known. Especially to be considered for this purpose are copolymers of a predominant proportion by weight of at least one aromatic monovinyl compound, such as, for example, styrene, substituted styrenes such as vinyl toluene, ethylstyrene or vinyl naphthalene, and a minor proportion of a polyethylenically unsaturated crosslinking agent preferably divinyl benzene, or a substituted divinyl benzene such as trivinylbenzene, divinyltoluene, divinylxylene, divinylethylbenzene, divinylether, ethyleneglycol dimethacrylate, ethyleneglycol diacrylate, trimethylolpropane trimethacrylate, diallymaleate, a polyester of polyhydric alcohol and an olefinically unsaturated carboxylic acid, such as for example, ethylene glycol and maleic acid. These copolymers can have either a gel structure or a sponge or macroreticular structure. The amount of crosslinking agent may vary within wide limits, but ordinarily it will be used in an amount of about ½ to about 40% by weight, preferably in an amount about 1 to about 30% by weight and more preferably about 3 to about 25% by weight, based on the total weight of the monomers. These copolymers may be prepared by any of the usual methods employed to polymerize monomeric vinyl type compounds. For instance, a mixture containing divinylbenzene and a monovinylaromatic compound, e.g., styrene may be polymerized in mass, or in the presence of a dispersion medium for the monomers by the use of heat, light or heat and light, in the presence or absence of a polymerization catalyst, at atmospheric, subatmospheric, or super atmospheric pressure. Suitable catalysts for effecting polymerization of the monomers are the peroxides such as benzoyl peroxide, lauroyl peroxide, hydrogen peroxide, etc. Per-compounds such as potassium persulfate, sodium perborate, and ammonium persulfate may also be employed as polymerization catalysts. The polymerization reaction is preferably carried out in aqueous dispersion. Usually a protective colloid such as sodium cellulose glycolate, hydroxyethylcellulose, methyl cellulose, etc. is added to the aqueous dispersion to aid in maintaining the monomers dispersed as droplets while polymerizing the same to solid hard granules.

The second step in the preparation of the large body of resins is one in which the insoluble, crosslinked polyvinyl hydrocarbon is haloalkylated. This step involves introducing into the polymer a plurality of bromoalkyl, or preferably chloroalkyl groups, that is groups having the general formula $-C_nH_{2n}-X$ as described above. While groups containing 1 to 4 carbon atoms are embraced in this step, it is usually preferred to employ those compounds in which chloromethyl groups $-CH_2Cl$ are added to the insoluble polymer, because the chloromethyl products are by far the most reactive. The carbon atoms in the group $-C_nH_{2n}-X$ may be in a straight or a branched chain.

The step of haloalkylating the insoluble copolymer may be carried out in a variety of ways. For example, the polymer may be reacted with haloalkylating agents such as a mixture of an aldehyde and a halogen acid (e.g., paraformaldehyde and hydrochloric acid), or a dihaloalkane and a Friedel-Crafts catalyst (e.g., ethylene dichloride and aluminum chloride) or a haloether and catalyst (e.g., chloromethyl methyl ether or bromomethyl methyl ether in the presence of zinc chloride, zinc oxide, stannic chloride, aluminum chloride, tin, zinc, iron, etc.). The halomethylation reaction, which occurs readily at temperatures in the range of from $-10°$ to $120°$ C or higher is carried out while the copolymer is swollen by, or dispersed in, an organic liquid, e.g., tetrachloroethylene, chlorobenzene, or an excess of the halomethylating agent, which liquid is less reactive with the halomethylating agent than is the polymer. The reaction is advantageously carried out to a point at which the resin product contains an average of at least one halomethyl radical per five aromatic nuclei and is usually contained until the product contains an average of from 0.8 to 1.2 halomethyl groups per aromatic nucleus. It is desirable that as many haloalkyl groups as possible be introduced into the insoluble copolymer because the number of such groups determines the number of quaternary ammonium groups in the final product; and of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity to be commercically attractive. The upper limit is that reached when every available position in the aromatic nuclei is haloalkylated. Satisfactory resins of high capacity can be made in which the number of haloalkyl groups, and hence the number of quaternary ammonium groups which are introduced is less than the theoretical maximum. After completing the halomethylating reaction, the resin is separated and washed with water or preferably is washed successively with an organic liquid such as acetone or ethyl alcohol and then washed with water. The halomethylated resin can then be used directly in wet condition or in dried condition as an agent for preparation of anion exchange resins.

As another example, when the monovinyl-aromatic component chemically combined in the copolymer contains one or more alkyl radicals, e.g., the methyl radical, as nuclear substituents, chlorine or bromine may be reacted with the copolymers in the presence of a halogenating catalyst such as phosphorus, phosphorus trichloride or light, promoting substitution of halogen in the alkyl radical, to obtain a vinyl-aromatic resin having halomethyl radicals attached to aromatic nuclei in the resin. The halogenation reaction may be carried out at temperatures of from $-10°$ to $150°$ C., preferably from $50°$ to $80°$ C., while the copolymer is swollen by, or dispersed in organic liquid such as chlorobenzene, benzene, ortho-dichlorobenzene, acetic acid, tetrachloroethylene, carbon tetrachloride, etc., which liquid is less reactive with the chloride or bromine than is the polymer. The reaction is advantageously carried to a point at which the resin product contains an average of at least one halogen atom per alkyl radical and is usually continued until the product contains an average of from 0.5 to 2.5, preferably from 0.8 to 1.5 halogen atoms per alkyl radical on an aromatic nucleus. The halogenation reaction is accompanied, at least to some extent by substitution of halogen in the aromatic nuclei and also in the polymeric chain of the resin.

Methods for chloroalkylating which may be used for introducing the $-CH_2Cl$ group and which also serve as guides for introducing $-C_2H_4X$, $-C_3H_6X$; and $-C_4H_8X$ groups are described in "Organic Reactions", Vol. 1, chapter 3, page 63 et seq. (John Wiley & Sons, Inc., N.Y.C., 1942).

Another body of resins that may be treated by the present invention an which have active chlorine groups left on the polymer network after the attempted complete conversion to anion exchange functionality are the nitrogen containing derivatives of copolymers of chloromethylstyrene and polyvinyl aromatic hydrocarbons, such as described in U.S. Pat. Nos. 2,992,544 and 3,843,566. These are the so called vinylbenzylchloride (VBC) resins as opposed to the CME (chloromethylated) resins exemplified previously. The chloromethyl styrene to be employed in making the copolymers is preferably meta, or para chloromethyl styrene. However, any of the isomeric ortho, meta or para chloromethylstyrenes, or mixtures of the isomers can be used. The term chloromethylstyrene pertains to the isomeric compounds of the formula $CH_2=CH\cdot C_6H_4\cdot CH_2Cl$.

These copolymers can be prepared in the usual manners described previously using the equivalent polyvinyl aromatic hydrocarbons as crosslinking agents, polymerization catalysts, etc. which allow the generation of subsequent anion exchange resins comparable to the CME resins, only differing to the extent of using a one step polymerization process to produce a reactive chlorinated intermediate for conversion to anion exchange functionality. The similarity of these resins to the ones described previously lies in the found observation that these products also exhibit chlorine migration when placed in the hydroxide form and that therefore to produce such products as virtually free of "active" chlorine in the hydroxide form requires both solvolytic displacement and a two-step conversion to the hydroxide form. The next step in the formation of the desired strongly basic, quaternary ammonium anion exchange resin is the amination of the haloalkylated copolymer intermediate with a tertiary amine. The tertiary amine is used in the form of the free base. Best results are obtained when the amine is one having the general formula $NR_1R_2R_3$ in which $R_1$, $R_2$, and $R_3$ represent methyl, ethyl, phenyl, benzyl, or beta-hydroxyethyl groups. Suitable amines for making desirable quaternary base resins are typified by trimethylamine, triethylamine, tripropylamine, dimethylethyl amine, diethyl cyclohexyl amine, dimethylbenzylamine, dimethylaminoethanol, dimethylaniline, dimethylaminopropyne, tributylamine, tricyclohexyl amine, triphenyl amine, diphenylethyl amine, benzylphenyl methylamine, and the like. This reaction is preferably carried out by adding the amine to the haloalkylated polymer while the latter is suspended and agitated in a liquid which is a solvent for the amine. The mixture may be allowed to react at room temperature, or preferably at elevated temperatures, after which the resin, containing quaternary ammonium salt groups is freed of the liquid.

After the amination is complete the resins are separated from the liquids and are freed of organic liquids by steam distillation. As ordinarily prepared, the products are in the form of quaternary ammonium salts and would then be converted into quaternary ammonium hydroxide by treatment with an aqueous solution of a hydroxide of an alkali metal.

By another embodiment of the invention, utilizing the "chloride trap", resins which do not contain non-ionic chloride in their polymer networks, by virtue of their particular method of preparation explained hereinafter, may also be produced with exceptionally low levels of active chloride, i.e., less than 0.5% and preferably less than 0.1% (based on total ion capacity).

With regard to such resins it is known that strongly basic anion exchange resins can be prepared without introducing chlorine or a chlorine containing compound to the resin as an intermediate stage to the production of the final product. One example of this type of product is the so called acrylic quaternary strong base resin made by direct amination of a crosslinked acrylic (or methacrylic) acid copolymer to form a weakly basic intermediate, followed by the addition of methyl chloride to the weakly basic site to form a quaternized resin site which now retains the original chlorine as ionic chloride. There is no chlorine imparted to the resin structure which does not exist as ionic chloride. Another example of this type of strongly basic anion exchange resin is made by direct acylaminomethylation of aromatic polymers as described in U.S. Pat. No. 3,791,966. This method comprises first the acylaminomethylation of an aromatic polymer, more preferably a crosslinked polystyrene with an N-methylol compound such as N-methylolacetamide or N-methylolformamide, or a methylene-bis-amide such as methylene-bis-formamide or other non-halogen containing precursors of the amidomethyl carbonium ion of the formula

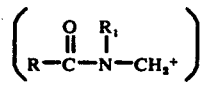

where R and $R_1$ may be hydrogen, alkyl or aryl, and where R can also be hydroxyalkyl, followed by hydrolyzing the polymer to remove the acyl groups to convert the polymer to a weakly basic resin, followed by quaternization, such as done above, to form the strong base resin.

With such resins it is only necessary to practice one phase of this invention to produce the virtually chloride free, strongly basic anion exchange resins in the hydroxide form, that is, to employ a chloride trap process of a preferred resin in a second ion exchange column connected in series to a first ion exchange column containing a product to be treated. The two columns may be regenerated in sequence (either forward or backward) with a desired chloride displacing agent to remove the ionic chloride from both resins, and then to retain the resultant low chloride residue state by polishing the subsequent base regenerant to an analytical state of purity. When such steps are practiced on quaternary base anion exchange resins produced without adding chlorine containing compounds to the copolymer network, the final chloride residue on the hydroxide form resin is determined by the efficiency of removal of the chloride displacement step by the intermediately selective agent and the purity of the caustic regenerant produced.

This is not necessarily the case when other strongly basic anion exchange resins are prepared by the known commercial processes of using free or bound chlorine containing agents to act as intermediary between the starting stage and the final stage of production of anion exchange resins. In such cases it has been observed that final products treated identically as described above do, nevertheless, increase in active chloride residue, even though the resin is protected from external contamination. The source of this chloride is, therefore, internal and occurs as a result of chlorine migration with time in the highly basic pH of the resin's environment. When such displacement occurs after the strongly basic resin has been converted to the hydroxide form, it will be impossible to retain the initial chloride residue value. In these cases, therefore, in which product deterioration will occur by internal sources after the resin conversion to hydroxide form, it will be necessary to pretreat the starting resin material to remove any potentially active chlorine groups and thereby prevent them from becoming active at a later stage. In these situations it will be necessary to practice solvolytic displacement, ionic chloride removal through use of a chlorine displacing agent of greater regenerability than caustic regenerants, and purification of the caustic regenerant solution through use of a chloride trap in order to achieve the same results as achieved with anion exchange resins made without potentially active chlorine groups as part of the ion exchange material.

EXAMPLE 1

This example is intended to show what typically happens when a resin, containing covalently bound chlorine, is converted to the hydroxide form using analytical $NaHCO_3$ and $NaOH$ reagents.

A 109 gram sample of a quaternary base anion exchange resin, prepared by a known intermediate process that contributes covalent chlorine to the product, and in the ionic chloride form, was charged to a standard ion exchange column and treated as follows:

Step a. Pass 10 bed volumes of an 8% solution of sodium bicarbonate, prepared from analytical reagent chemical and deionized water, over the resin at a rate of 0.4 gpm/ft.$^3$. Rinse resin to remove this regenerant solution.

Step b. Convert this $HCO^{-3}$ form of the resin to the hydroxide form by passing 3.33 bed volumes of a 2 N NaOH solution prepared from analytical reagent NaOH and deionized water, over the resin at a rate of 0.25 gpm/ft.$^3$. Rinse the resin free of excess caustic regenerant.

Step c. Remove resin from column, Buchner drain off excess water under a nitrogen atmosphere, transfer a known amount of representative sample to a column apparatus, and quantitatively displace all of the $OH^-$, $CO_3^{125}$, and $Cl^-$ ions from the resin into a volumetric receiving flask via an excessive amount of a sodium nitrate solution, the resin having a greater affinity for $NO_3^{116}$ ion than the other ions on the anion exchange resin.

Quantitatively measure the amounts of $OH^-$, $CO_3^{125}$, and $Cl^-$ ions by known analytical procedures.

| Results - | Expressed as equivalent per cent of the total ions eluted | |
|---|---|---|
| | 1 Day | 16 Days |
| *E % OH⁻ | 97.240 | 96.791 |
| E % CO₃⁻ | 2.560 | 2.965 |
| E % Cl⁻ | 0.200 | 0.244 |
| Total | 100.00 | 100.00 |

*E % means equivalent percent based on the total ion exchange capacity of the resin To summarize, when not pretreated for solvolytic displacement, the chloride content after 1 day storage in the hydroxide form is equal to 0.200 equivalent per cent of the resin's capacity. Upon further standing for 16 days in a sealed container, the chloride content increased to 0.244 equivalent percent of capacity.

EXAMPLE 2

This example illustrates what occurs when the same lot of resin as in the preceeding example is predigested (solvolytic displacement) for 2 hours at 95° C in solutions of deionized water and 0.5, 1.0, and 2.0 N caustic solutions prior to the identical chloride ion displacement and hydroxide ion conversion processes described in Example 1.

Four 109 gram samples of the same resin used for Example 1 were charged to standard laboratory round bottom flasks, equipped with heating mantels and stirrers. One bed volume of each of the following four reagents was added to one of the flasks, heat applied to elevate the temperature to 95° C, and the resins were then stirred for 2 hours each, holding the temperature at 95° C in each case.

Reagent No. 1 — Deionized Water
Reagent No. 2 — 0.5 N NaOH Solution
Reagent No. 3 — 1.0 N NaOH Solution
Reagent No. 4 — 2.0 N NaOH Solution After this pre-digestion, the resin slurries were cooled immediately, rinsed free of the previously added reagent, charged to the standard ion exchange columns, and then treated in the identical manner as described in Steps a, b, and c of Example 1.

| Results - Reagent | Expressed as equivalent per cent of the total ions eluted. | | E % OH⁻ | E% CO₃⁻ | E % Cl⁻ |
|---|---|---|---|---|---|
| 1 | D.I. H₂O* | 1 day | 98.20 | 1.63 | 0.17 |
| | | 21 days | 97.07 | 2.72 | 0.21 |
| 2 | 0.5 N NaOH | 1 day | 98.87 | 1.10 | 0.03 |
| | | 21 days | 98.04 | 1.91 | 0.054 |
| 3 | 1.0 N NaOH | 1 day | 98.80 | 1.17 | 0.03 |
| | | 21 days | 98.24 | 1.71 | 0.047 |
| 4 | 2.0 N NaOH | 1 day | 98.87 | 1.10 | 0.03 |
| | | 21 days | 98.04 | 1.92 | 0.046 |

*Deionized Water

It may be seen from the foregoing data that even a boiling water pretreatment process has some slight solvolytic displacement capability, as the equivalent percent chloride values shown in the table for 1 and 21 days standing are less than the values shown in Example 1 for 1 and 16 days standing. The presence of a basic pH is preferred, however, since all three base catalyzed digestions produced products of lower equivalent percent chloride values, which remained low after 21 days storage in the hydroxide form.

EXAMPLE 3

This example illustrates the effects of temperature of digestion (solvolytic displacement) and to a limited extent time of digestion on the % chloride residues. Under a consant 1 N NaOH solution background, the residual chloride content decreases with an increase in the temperature of digestion. Time of digestion appears to be of a lower significance in this example, although it is shown to be significant in a subsequent example.

Four 109 gram samples of a batch of quaternary base anion exchange resin, made by the same process that produced the resin sample evaluated in Examples 1 and 2, were placed into round bottom flasks. One bed volume of a 1N NaOH solution was charged to each flask and the samples stirred and heated according to the following programs:

Sample 1. Heated to 95° C, stirred and held at 95° C for 1 hour
Sample 2. Heated for 75° C, stirred and held at 75° C for 1 hour
Sample 3. Heated to 75° C, stirred and held at 75° C for 2 hours
Sample 4. Heated to 50° C, stirred and held at 50° C for 2 hours.

After this pre-digestion, the resin slurries were cooled immediately, rinsed free of the previously added reagents, charged to the standard ion exchange columns and then were treated in the identical manner as described in Steps a, b, and c of Example 1.

| Results - | Expressed as equivalent per cent of the total ions eluted: | | | |
|---|---|---|---|---|
| | Sample 1 | Sample 2 | Sample 3 | Sample 4 |
| E % OH⁻ | 98.86 | 98.72 | 98.84 | 98.56 |
| E % CO₃⁻ | 1.12 | 1.23 | 1.12 | 1.34 |
| E % Cl⁻ | 0.02 | 0.05 | 0.04 | 0.10 |
| Total | 100.00 | 100.00 | 100.00 | 100.00 |

EXAMPLE 4

This example illustrates the effects of digestion time and caustic concentration during the solvolytic displacement process on a prototype sample of the same resins evaluated in the previous examples, only this time the resin sample was obtained from a plant reaction kettle prior to completion of the production process. The purpose of this example was to determine if the solvolytic displacement process could be performed on unfinished resin, prior to removal from its original reaction vessel.

Four 109 gram samples of a third batch of the quaternary base anion exchange resin made by the same process that produced the resin samples evaluated in Examples 1, 2, and 3, were placed into round bottom flasks. This resinous product had been taken from a large scale plant kettle during the actual synthesis step and represents an intermediate stage of preparation.

The resin samples were pre-digested as follows:
Sample 1. Heat to 95° C and hold for 1 hour in one bed volume of 0.5N NaOH solution.
Sample 2. Heat to 95° C and hold for 2 hours in one bed volume of 0.5N NaOH solution.
Sample 3. Heat to 95° C and hold for 2 hours in one bed volume of 0.83N NaOH solution.
Sample 4. Heat to 95° C and hold for 2 hours in 1.5 bed volume of 1.35N NaOH solution.

After the pre-digestion, the resin slurries were cooled immediately, rinsed free of the previously added reagents, charged to the standard ion exchange columns and were then treated in the identical manner as described in steps a, b, and c of Example 1.

| Results - | Expressed as equivalent percent of the total ions eluted. | | |
|---|---|---|---|
| | | E % OH⁻ | E % CO₃⁼ | E % Cl⁻ |
| Sample 1 | 1 day | 98.37 | 1.57 | 0.06 |
| | 14 days | 96.44 | 3.45 | 0.11 |
| Sample 2 | 1 day | 97.75 | 2.20 | 0.05 |
| | 14 days | 96.72 | 3.20 | 0.08 |
| Sample 3 | 1 day | 98.56 | 1.40 | 0.04 |
| | 14 days | 96.74 | 3.20 | 0.06 |
| Sample 4 | 1 day | 98.44 | 1.53 | 0.03 |
| | 14 days | 97.02 | 2.94 | 0.04 |

At the constant temperature of 95° C, these data show lower chloride residues results with an increased caustic concentration on this sample of resin. The combination of longer digestion time, highest caustic concentration, and largest solution/resin volume produces a product having the lowest chloride residues initially and upon storage in the OH⁻form for 2 weeks time.

EXAMPLE 5

This example illustrates the ability of the solvolytic displacement process to work successfully on covalently bound chlorine imparted to the intermediate form of the resin by a completely different synthesis approach —(all prior noted resin samples were prepared by a chloromethyl methyl ether process, while the data in Example 5 relate to resinous products prepared by a vinyl benzyl chloride process). The line of approach works successfully for both synthetic methods since solvolytic displacement of bound chlorine occurs in either case, once the resin products have been coverted to the hydroxide form.

One 109 gram sample of a quaternary base anion exchange resin, prepared by a different synthetic process than those described previously, but one which is also known to add covalently bound chlorine to the copolymer, was charged to a standard ion exchange column and treated exactly as described in Steps a, b, and c of Example 1. This sample was not pre-digested for solvolytic displacement, and is called sample No. 1.

Two 109 gram samples of the above resin were placed into round bottom flasks equipped with heating mantels and stirrers. One bed volume of a 1 N NaOH solution was added to each flask, the contents heated to 95° C and held at 95° C for 2 hours. After this digestion, the resin samples were immediately cooled, rinsed, charged to columns and then treated in the identical manner as described in Steps a, b, and c, of Example 1. The resin products were labeled Samples No. 2 and 3.

| Results - | Expressed as equivalent percent of the total ions eluted. | | |
|---|---|---|---|
| | | E % OH⁻ | E % CO₃⁼ | E % Cl⁻ |
| Sample 1 | 1 day | 97.61 | 2.22 | 0.17 |
| | 16 days | 97.02 | 2.67 | 0.31 |
| Sample 2 | 1 day | 98.39 | 1.59 | 0.02 |
| | 13 days | 97.58 | 2.38 | 0.04 |
| | 28 days | 97.12 | 2.84 | 0.04 |
| Sample 3 | 1 day | 98.38 | 1.59 | 0.03 |
| | 13 days | 98.02 | 1.94 | 0.04 |
| | 28 days | 97.96 | 2.00 | 0.04 |

As the data show, the non-treated resin retains an initial chloride residue comparable to that shown in Sample 1 for the other synthesis approach sample, and increases in its chloride residue upon storage in a closed container for 16 days to a value almost twice its original value. However, both samples pre-treated to induce solvolytic displacement exhibit very low initial chloride residues and retain these low chloride values even after 28 days storage in the hydroxide form in sealed containers.

EXAMPLE 6

This example illustrates the use of a highly cross-linked anion exchange resin, highly selective for chloride ion, to prepare a low chloride NaOH solution which may be used to prepare the "chloride free" anion exchange resins of the invention.

Standard laboratory column apparatus is provided consisting of 1 inch inside diameter glass pipe of 2 feet length having a screen attached to one end to retain the resin in the column while solution exchange is performed on the resin.

Separate 109 gram quantities of quaternary, type I, anion exchange resins, i.e., quaternary ammonium styrene-divinylbenzene gel type (Amberlite IRA—400) and quaternary ammonium styrene-divinylbenzene macroreticular type (Amberlite IRA–904), both products in the chloride form, are charged to the columns and backwashed with water for classification purposes.

One sample each of the IRA–400 and the IRA–904 was treated with a chloride displacing agent $H_2SO_4$, by passing six bed volumes (B.V.'s) of a 1 M $H_2SO_4$ solution analytical reagent (A.R.) in deionized (D.I.) water over each resin at a rate of 0.4 gpm/ft.³ passing the waste to drain. Each column was rinsed with four B.V.'s of D.I. water at the same rate. A second sample of IRA–400 in the chloride form was treated with 10 B.V.'s of an 8% $NaHCO_3$ solution (A.R. in D.I. water) at 0.4 gpm/ft³ passing the waste to drain. The column was rinsed with four B.V.'s of D.I. $H_2O$ at the same rate.

Each resin was then regenerated to the hydroxide form by passing 10 B.V.'s of 1.75 N NaOH solution prepared from a commercial supply of 50% NaOH solution and laboratory D.I. water over the beds at a rate of 0.5 gpm/ft³. This 1.75 N NaOH solution was subsequently analyzed and found to contain 14 ppm. of chloride ion as $CaCO_3$.

Without rinsing, the flow rate of the NaOH solution was increased to 2 gpm/ft³ and effluent samples were collected from each column for an arbitrary 100 B.V.'s of product solution. The alkalinity was neutralized with a 6 M solution of $HNO_3$ (A.R. in D.I. $H_2O$) and the chloride content in each sample was determined by the mercuric thiocyanate — ferric ammonium sulfate test method such as described in the Manual on Industrial Water & Industrial Waste Water, Second Edition, pages 237–239, and "Photometric Determination of Chlorides in Water", David M. Zall, Donald Fisher and Mary Q. Garner, Analytical Chemistry, Volume 28, No. 11, November, 1956.

Results:
The chloride concentrations found in the effluents from each column were as follows:

| Resin | Amberlite IRA-400 | Amberlite IRA-904 | Amberlite IRA-400 |
|---|---|---|---|
| Cl⁻ Displacing Agent | $NaHCO_3$ | $H_2SO_4$ | $H_2SO_4$ |

-continued

| B.V.s of NaOH Treated | | PPM Cl⁻ (as CaCO₃) | | |
|---|---|---|---|---|
| 0–5 | Composite | 5.5 | 9.0 | 3.0 |
| 11–15 | " | 2.5 | 6.2 | 2.2 |
| 21–25 | " | 3.2 | 6.0 | 3.2 |
| 31–35 | " | 6.2 | 5.2 | 5.8 |
| 41–45 | " | 11.5 | 5.5 | 10.0 |
| 51–55 | " | 14.0 | 5.0 | 13.0 |
| 66–70 | " | 15.0 | 5.0 | 15.0 |
| 81–85 | " |  | 4.8 |  |
| 96–100 | " |  | 5.2 |  |

Influent Cl⁻ Conc. in 1.75 N NaOH Sol'n = 14 ppm as CaCO₃

These data show that a quaternary amine strong base resin, like IRA-400, when previously stripped of chloride by the use of $H_2SO_4$ and $NaHCO_3$ agents, can remove more than 50% of the chloride content in the influent 1.75N NaOH solution for up to 35 B.V.'s producing a minimum concentration of less than 3 ppm Cl⁻ as $CaCO_3$. This product can effect some reduction in the chloride content for up to 50 B.V.'s.

The IRA-904 product after treatment by the $H_2SO_4$ agent as described can reduce the chloride content to ca. 5 ppm. for 100 B.V.'s, with no sign of breakthrough given. Although the system is not optimized, the IRA-904 type product is preferred due to a higher selectively for chloride as a result of a substantial increase in internal crosslinking content.

EXAMPLE 7

This example illustrates the effect of increasing the volume of $H_2SO_4$ used to displace chloride ion from the resin, and the effects of varying the flow rate during the subsequent treatment of the caustic solution.

A 600 ml. sample of IRA-904 in the chloride form was charged to a 2 inch diameter glass column and treated with eight bed volumes of 1 M $H_2SO_4$ solution prepared with commercial grade $H_2SO_4$ and laboratory deionized water at a rate of 0.4 gpm/ft³. The bed was then rinsed with four bed volumes of D.I. $H_2O$ at 0.5 gpm/ft³.

Separate portions of this sample of treated IRA-904 were then loaded into three laboratory buret columns and each regenerated with 5 B.V.'s of 1.8 N NaOH solution, prepared from the commercial 50% NaOH solution and laboratory D.I. $H_2O$, at a rate of 0.25 gpm/ft³. This 1.8 N NaOH solution also has a chloride content of 14 ppm as $CaCO_3$.

The flow rates of the NaOH solution were increased to 0.5, 1.0 and 2.0 gpm/ft³ with effluent samples collected periodically and analyzed for chloride content as described in Example 6.

Results:
Influent Cl⁻ conc. in 1.8 N NaOH Solution = 14 ppm as CaCO₃

| Treatment gpm/ft³ Flowrate | 0.5 | | 1.0 | | 2.0 | |
|---|---|---|---|---|---|---|
| | B.V.'s NaOH | ppm Cl⁻ as(CaCO₃) | B.V.'s NaOH | ppm Cl⁻ as (CaCO₃) | B.V.'s NaOH | ppm Cl⁻ (as CaCO₃) |
| | 1 | 2.75 | 1 | 3.0 | 1 | 3.0 |
| | 8.5 | 3.25 | 11 | 3.25 | 21 | 2.5 |
| | 16 | 3.50 | 31 | 2.75 | 41 | 5.25 |
| | 25 | | 51 | 4.25 | 61 | 2.75 |
| | | 4.0 | 71 | 4.25 | 81 | 3.25 |
| | 90 | | 91 | 5.00 | 101 | 5.0 |
| | 101 | 3.75 | 101 | 4.75 | 121 | 5.75 |
| | 121 | 4.5 | 111 | 4.75 | 141 | 7.25 |
| | 141 | 6.0 | 131 | 5.75 | 151 | 8.25 |
| | 161 | 8.75 | 141 | 6.75 | 181 | 10.5 |
| | 171 | 10.25 | 171 | 10.25 | 201 | 11.5 |
| | 181 | 12.50 | 181 | 11.25 | 221 | 12.5 |
| | | | 191 | 12.5 | 261 | 14.25 |
| | | | 201 | 13.0 | | |
| | | | 211 | 14.2 | | |

These results show that the increase in the volume of the $H_2SO_4$ displacing agent over IRA-904 lowered the effluent Cl⁻ leakage in the NaOH solution to 3–5 ppm, down from the 5–6 ppm obtained in Example 6. The resin produced this quality of NaOH for 100 to 140 bed volumes, depending on flow rate. Although the capacity of the resin system is reduced slightly with increasing treatment rate, no effect of treatment rate is observed on the quality of the NaOH solution product produced by the system. It is important to note that these results were achieved using commercial sulfuric acid and solution hydroxide solutions.

EXAMPLE 8

This example illustrates preparation of a chloride-trap resin for polishing the NaOH used in subsequent conversion of the product resin to the hydroxide form.

Three 2 inch I.D. glass columns were prepared containing fresh Amberlite IRA-904 in the CL⁻ form at a 12 inch bed depth on the retaining screen. Displaced the chloride from the resins using the following three procedures:

1. Eluted with 10 B.V.'s of a 1 M $H_2SO_4$ solution prepared from commercial concentrated $H_2SO_4$ and laboratory D.I. water at a rate of 0.3 gpm/ft³. Rinsed ith D.I. water 2. Eluted with 20 B.V.'s of an 8% $NaHCO_3$ solution prepared from commercial $NaHCO_3$ chemical and laboratory D.I. water at a rate of 0.6 gpm/ft³. Rinsed with D.I. water.

3. Eluted with 10 B.V.'s of a 1 M $NaNO_3$ solution prepared from analytical reagent grade $NaNO_3$ and laboratory D.I. water at a rate of 0.3 gpm/ft³. Rinsed with D.I. water.

Next, obtained a second lot of commercial 50% NaOH solution and dilute it to 1 N and 2 N concentrations using laboratory D.I. water. These solutions were analyzed for chloride content and found to contain 25.5 and 51 ppm chloride as $CaCO_3$. Using these NaOH solutions, regenerated portions of the previously treated IRA-904 samples were transferred to buret columns, according to the following schedule:

| NaOH Solution Strength | 2 Normal | | |
|---|---|---|---|
| Cl⁻ Displacing Agent | $H_2SO_4$ | $H_2SO_4$ | $NaHCO_3$ |
| Bed Vols. NaOH Sol'n. | 5 | 5 | 5 |
| Flow Rate, gpm/ft³ | 0.5 | 0.5 | 0.5 |
| NaOH Solution Strength | 1 Normal | | |
| Cl⁻ Displacing Agent | $H_2SO_4$ | $NaHCO_3$ | $NaNO_3$ |
| Bed Vols. NaOH Sol'n. | 10 | 10 | 10 |
| Flow Rate, gpm/ft³ | 1 | 1 | 1 |

Without rinsing, increased the flow rate of the 1N and 2N NaOH solutions to 2 or 4 gpm/ft³, periodically sampled each effluent, neutralizing the alkalinity with 6M $HNO_3$ solution (A.R.), and analyzing for chloride content using the mercuric thiocyanate ferric ammonium sulfate test method. The results are summarized in the following tables:

Treatment of 2N NaOH Solution Containing 51 ppm Cl⁻ (as $CaCO_3$)

| Prior Cl⁻ Displacing Agent NaOH Sol'n. | $H_2SO_4$ | $H_2SO_4$ | $NaHCO_3$ |
|---|---|---|---|
| Treatment Rate gpm/ft³ | 2 | 4 | 2 |
| Bed Vol. NaOH Sol'n. Treated | ppm Cl⁻ (as $CaCO_3$) in effluent | | |
| 20 | 2.4 | 2.4 | 1.8 |
| 40 | 2.6 | 3.2 | 2.0 |
| 60 | 3.6 | 6.5 | 3.2 |
| 80 | 11.2 | 11.8 | 10.0 |
| 100 | 22.0 | 18.6 | 22.5 |
| 120 | 33.0 | 27.4 | 36.0 |
| 140 | 40.5 | 33.7 | 46.0 |
| 160 | 46.0 | 38.0 | 50.0 |

Treatment of 1N NaOH Solution Containing 25.5 ppm Cl⁻ (as $CaCO_3$)

| Prior Cl⁻ Displacing Agent NaOH Sol'n. | $H_2SO_4$ | $NaHCO_3$ | $NaNO_3$ |
|---|---|---|---|
| Treatment Rate gpm/ft³ | 2 | 2 | 2 |
| Bed Vol. NaOH Sol'n. Treated | ppm Cl⁻ (as $CaCO_3$) in effluent | | |
| 30 | 1.8 | 1.0 | 6.8 |
| 60 | 2.0 | 1.0 | 10.0 |
| 90 | 2.2 | 1.3 | 12.8 |
| 120 | 4.6 | 2.2 | 18.0 |
| 150 | 7.8 | 3.7 | 17.2 |
| 180 | 11.7 | 8.0 | 17.2 |
| 210 | 15.4 | 15.0 | 17.7 |
| 240 | 17.6 | 20.5 | 19.4 |
| 270 | 20.0 | 24.8 | 20.2 |
| 300 | 21.4 | 26.4 | 20.2 |

These results show that this process continues to produce near analytical grade (1 ppm Cl⁻) NaOH effluent solutions from influent 1N and 2N NaOH solutions containing 25.5 and 51 ppm chloride respectively. When using either commercial reagent $H_2SO_4$ or $NaHCO_3$ solutions as the chloride displacing agents, at least 50 B.V.'s of the 2N NaOH solution and at least 100 B.V.'s of the 1N NaOH solution can be treated before a significant breakthrough occurs of the influent chloride content. The process continues to provide NaOH solutions of reduced chloride content beyond these points. When using the $NaNO_3$ solution as the Cl⁻ displacing agent, the treated NaOH effluent shows some reduction in the chloride content, but the process is less efficient, probably due to too high a $NO_3^-$ selectivity for effective Cl⁻ pick-up.

EXAMPLE 9

This example is made to study the effects of the following:

1. To determine if a low chloride effluent NaOH solution could be produced from an influent NaOH solution containing even higher chloride contents and also when prepared in a background solution containing other ions, such as found in Philadelphia city water.
2. To determine the effects of multiple cycling on the quality of the effluent NaOH solution produced, and
3. To use the process to prepare virtually chloride free, strongly basic anion exchange resins in the hydroxide form.

PART A

Preparation of a "Chloride Free" Hydroxide Form Strongly Basic Anion Exchange Resin Using Analytical Reagent Chemicals A 25 gram sample of a strongly basic anion exchange resin in the chloride form is charged to a buret column and backwashed with deionized water.

Ten bed volumes of an 8% $NaHCO_3$ solution (A. R. chemical in deionized water) are passed through the column at a rate of 0.4 gpm/ft³. The column is then rinsed with three B.V.'s of deionized water.

Next, 5 B.V.'s of a 2N NaOH solution (A.R. chemical in deionized water) are passed over the resin at a rate of 0.25 gpm/ft³. This 2N NaOH solution is analyzed and found to contain less than 1 ppm Cl⁻ (as $CaCO_3$). The caustic solution is rinsed from the resin column.

The resin product is removed from the column, Buchner drained under nitrogen, and eluted with an excessive amount of 1M $NaNO_3$ solution into a volumetric flask. The solution is analyzed for $OH^-$, $CO_3^=$ and Cl⁻ contents. The results, expressed as equivalent percent of the resin's total capacity, are as follows:

| E % | $OH^-$ | = | 97.49 |
|---|---|---|---|
| E % | $CO_3^-$ | = | 2.48 |
| E % | Cl⁻ | = | 0.03 |
| | | Total | 100.00 |

These results show that when using analytical reagent chemicals on a strongly basic anion exchange resin originally in the chloride form, a final product over 97% in the $OH^-$ form is produced, containing only 0.3 equivalent percent of the exchange sites in the chloride form.

PART B

Preparation of a "Chloride Free" Hydroxide Form Strongly Basic Anion Exchange Resin Using Commercial Grade Chemicals Prepared in Philadelphia City Water and using an IRA-904 Cl⁻ Trap Column A 109 gram sample of the same resin treated in part A with analytical reagent chemicals is charged to a 1 inch diameter glass column.

A 23 gram sample of IRA-904 is charged to a 0.5 inch diameter glass column. Both resins are in the original Cl⁻ form.

Ten bed volumes of an 8% $NaHCO_3$ solution (commercial grade in deionized water) are passed over the resin in the 1 inch diameter glass column at a rate of 0.4 gpm/ft³, with the waste effluent solution passed continuously over the IRA-904 resin contained in the 0.5 inch diameter glass column. The first column is rinsed with 4 B.V.'s of deionized water, with the rinse effluent passed continuously over the IRA-904 column.

A new bottle of commercial 50% NaOH solution is obtained and a 2 Normal strength solution is prepared in Philadelphia city water, previously analyzed and found to contain, among other ions, the following:

| 40 ppm | $Cl^-$ | (as $Cl^-$) |
| 35 " | $SO_4^=$ | (as $SO_4^=$) |
| 5 " | $NO_3^-$ | (as $NO_3^-$) |
| 57 " | $HCO_3^-$ | (as $HCO_3^-$) |

The resultant 2N NaOH solution was analyzed and found to contain 132 ppm $Cl^-$ (as $CaCO_3$).

Five bed volumes of this 2 N NaOH solution (per B.V. of the resin in the 1 inch diameter column) are initially passed through the IRA-904 resin column with the treated 2N NaOH solution now passed over the resin contained in the 1 inch diameter column. The flow rate is 0.25 gpm/ft$^3$ based on the resin volume in the 1 inch column. After each bed volume of NaOH solution passes through the 1 inch column, a sample of the 2N NaOH solution produced by the 0.5 inch column of IRA-904 is collected, neutralized and analyzed for chloride. The NaOH solution is rinsed from the resins.

The resin in the 1 inch diameter column is removed, Buchner drained under nitrogen, eluted with an excessive amount of 1 M $NaNO_3$ solution into a volumetric flask, and analyzed for $OH^-$, $CO_3^=$ and $Cl^-$ contents. The results expressed as equivalent percent of the resin's total capacity, together with the $Cl^-$ analysis on the 2N NaOH solution produced by the IRA-904 column, are as follows:

| Chloride in Effluent NaOH Solution from IRA-904 column | |
|---|---|
| Bed Volumes from 1" Column | ppm $Cl^-$ (as $CaCO_3$) |
| 1st | 2.0 |
| 2nd | 1.6 |
| 3rd | 1.6 |
| 4th | 1.6 |
| 5th | 2.0 |
| Resin Analysis | |
| Equivalent Percent $OH^-$ = | 96.75 |
| Equivalent Percent $CO_3^=$ = | 3.20 |
| Equivalent Percent $Cl^-$ = | 0.05 |
| Total = | 100.00 |

These results show that using the IRA-904 chloride trap column to treat an influent 2N NaOH solution prepared in Philadelphia city water and containing 132 ppm $Cl^-$ as $CaCO_3$, an effluent 2N NaOH solution containing only 1.6–2.0 ppm $Cl^-$ is obtained. This result is achieved using commercial $NaHCO_3$ chemicals and waste regenerant from the resin product column. Thus, the IRA-904 resin can function effectively under less than ideal circumstances.

The resultant product resin is virtually identical in quality to the product produced in part A using analytical reagent chemicals.

PART C:

A Reapeat Cycle of Part B

A 109 gram sample of the same resin treated in parts A & B is charged to the 1 inch diameter glass column. The IRA-904 resin contained in the 0.5 inch diameter column is retaind.

A new supply of 2N NaOH solution is prepared in Philadelphia city water, analyzed for chloride and found to contain 160 ppm $Cl^-$ (as $CaCO_3$).

The entire procedure using the double bed system described in Part B is repeated, with the following results.

| Chloride in Effluent NaOH Solution from IRA-904 Column | |
|---|---|
| Bed Volumes from 1" Column | ppm $Cl^-$ (as $CaCO_3$) |
| 1st | 0 |
| 2nd | 0 |
| 3rd | 0 |
| 4th | 0 |
| 5th | 0 |
| Resin Analysis | |
| Equivalent Percent $OH^-$ = | 96.42 |
| Equivalent Percent $CO_3^=$ = | 3.55 |
| Equivalent Percent $Cl^-$ = | 0.03 |
| Total = | 100.00 |

These data show that the "choride trap process" is not only repetitive, but that the quality of effluent NaOH solution improves with cycling. This is probably a result of a cumulative removal effect of the total available chloride ion on the resin with added cycles. Thus, in a normal cyclic commercial system of repetitive use of this process on a single bed of IRA-904, for example, truly chloride free, analytical grade quality, NaOH solutions would be produced.

The result of this condition is that the resin product is now identical in the chloride residue to the resin product produced previously using analytical reagents.

We claim:

1. A process for preparing a strong anion exchange resin containing less than 0.5% of active chloride which comprises subjecting a strong anion exchange resin containing residual non-ionic chlorine in its polymeric network to solvolytic displacement which consists of contacting the resin with an aqueous solution having a pH of at least 7 and a temperature of at least 50° C for a period of time necessary to convert the non-ionic chlorine to chloride and thereafter removing the chlorine from the resin.

2. The process of claim 1 wherein the solvolytic displacement is accomplished by subjecting the chloride form resin to an aqueous solution of about 1 N NaOH for about 2 hours at a temperature of between 50° C and 120° C.

3. The process of claim 1 wherein the chloride form resin, after solvolytic displacement, is converted to the $HCO_3^-$ form using an aqueous solution of sodium bicarbonate prior to conversion to the hydroxide form.

4. The process of claim 1 wherein the chloride form resin, after solvolytic displacement, is converted to the $HSO_4^- \longleftrightarrow SO_4^=$ form using an aqueous solution of sulfuric acid prior to conversion to the hydroxide form.

5. The process of claim 1 wherein the chloride form resin, after solvolytic displacement, is converted to the $NO_3^-$ form using an aqueous solution of nitric acid prior to conversion to the hydroxide form.

6. The process of claim 1 wherein the chloride form resin, after solvolytic displacement, is converted to the $CO_3^=$ form using an aqueous solution of sodium carbonate prior to conversion to the hydroxide form.

7. The process of claim 1 wherein the caustic solution used to convert the resin to hydroxide form has been treated previously with ion exchange resin highly selective for chloride to remove minute amounts of chloride impurities.

8. A process for preparing a strong anion exchange resin essentially free of active chloride which comprises converting a strong anion exchange resin, containing no residual nonionic chlorine in its polymer network in the chloride form, to the hydroxide form by first treating the resin with a solution containing ions for which the resin has intermediate selectivity between chloride and hydroxide to convert the resin to the intermediate ion form and subsequently treating the resin in the intermediate ion form with a caustic solution that has been previously passed through a bed containing an ion exchange resin highly selective for chloride to remove minute amounts of chloride impurities.

9. The process of claim 8 wherein the ion exchange resin highly selective for chloride is a quaternary anion exchange resin having a high degree of crosslinking.

10. A strong anion exchange resin essentially free of active chloride when produced in accordance with claim 1, said resin being of the class produced using an intermediate step wherein covalent chlorine is introduced into the copolymer network.

11. Strong anion exchange resin essentially free of active chloride when produced in accordance with claim 1, said resin being produced initially in the normal chloride form by a process involving chloromethylation of the copolymer before functionalization.

12. The strong anion exchange resin of claim 10 wherein the available chloride is less than 0.1% by weight, based on the total ion capacity of the resin, which resin does not increase in available chloride content by more than 0.1% by weight, based on the total ion capacity of the resin, after standing under an inert atmosphere at a temperature between about 20° C and 30° C for 21 days.

13. A strong anion exchange resin derived from vinly benzyl chloride when prepared in accordance with claim 1 wherein the available chloride is less than 0.1% by weight, based on the total ion capacity of the resin, which resin does not increase in available chloride content by more than 0.1% by weight, based on the total ion capacity of the resin, after standing under an inert atmosphere at a temperature between about 20° C and 30° C for 21 days.

14. The process of claim 1 wherein the strong anion exchange resin containing residual non-ionic chloride in its polymeric network is subjected to solvolytic displacement while in its chloride form and thereafter is converted to the hydroxide form by first treating the resin with a solution containing ions for which the resin has intermediate selectivity between chloride and hydroxide to convert the resin to the intermediate ion form and subsequently treating the resin in the intermediate ion form form with a caustic solution to convert the resin to the hydroxide form.

15. The process of claim 13 wherein solvolytic displacement is conducted at a temperature between about 60° C and 120° C with an aqueous caustic solution.

* * * * *